(12) United States Patent
Matsunaga et al.

(10) Patent No.: US 7,118,250 B2
(45) Date of Patent: Oct. 10, 2006

(54) VEHICULAR LAMP AND METHOD OF MANUFACTURING SAME

(75) Inventors: Chiharu Matsunaga, Shizuoka (JP);
Michihiko Suzuki, Shizuoka (JP);
Fujihiko Sugiyama, Shizuoka (JP);
Kazuhiro Yamazaki, Shizuoka (JP)

(73) Assignee: Koito Manufacturing Co., Ltd., Shizuoka (JP)

( * ) Notice: Subject to any disclaimer, the term of this patent is extended or adjusted under 35 U.S.C. 154(b) by 114 days.

(21) Appl. No.: 10/909,731

(22) Filed: Aug. 2, 2004

(65) Prior Publication Data

US 2005/0030751 A1 Feb. 10, 2005

(30) Foreign Application Priority Data

Aug. 5, 2003 (JP) .......................... P 2003-286456

(51) Int. Cl.
*F21V 31/00* (2006.01)

(52) U.S. Cl. ........................ 362/267; 362/310; 362/520

(58) Field of Classification Search ................ 362/267, 362/375, 457, 546, 310, 520
See application file for complete search history.

(56) References Cited

U.S. PATENT DOCUMENTS 6,464,374 B1 * 10/2002 Akiyama et al. ........... 362/267
6,478,451 B1   11/2002 Akiyama et al. ........... 362/267
6,592,239 B1    7/2003 Akiyama et al. ........... 362/267

FOREIGN PATENT DOCUMENTS

JP      P2001-243811 A    9/2001

OTHER PUBLICATIONS esp@cenet document view, Patent No..:JP2001243811; Publication Date: Sep. 7, 2001, 1 page.

* cited by examiner

*Primary Examiner*—Sandra O'Shea
*Assistant Examiner*—James W Cranson, Jr.
(74) *Attorney, Agent, or Firm*—Osha Liang LLP (57) ABSTRACT

A vehicular lamp includes a lamp source, a lamp body accommodating the lamp source, and a lens attached to the lamp body. The lamp body has an abutment surface on the top portion of a peripheral wall, which is configured to rise in a direction of an optical axis of the light source along a peripheral edge of the lamp body. The abutment surface of the lamp body is configured to incline to the optical axis. Similary, the lens has an abutment surface corresponding to the abutment surface of the lamp body along a peripheral portion of the lens. In this case, the abutment surface of the lens is configured within the dimention of an outer surface of the lens so as not to protrude over the outer surface. The abutment surfaces of the lamp body and the lens are integrally jointed together by laser walding.

9 Claims, 9 Drawing Sheets

PRIOR ART

VEHICULAR LAMP AND METHOD OF MANUFACTURING SAME

BACKGROUND OF INVENTION

1. Field of the Invention

The present invention relates to a vehicular lamp with a lens attached to a lamp body by laser welding and a method of manufacturing same.

2. Background Art

A vehicular lamp, such as a headlamp for a motor vehicle, is configured to dispose a bulb as a light source and a reflector in a lamp chamber, which is formed by attaching a lens to a front opening of a lamp body. For a configuration in which the lens is attached to the front opening of the lamp body, the prior art has used a laser welding method or the like. Patent Document 1 discloses a laser beam receiving surface is configured in a flange-like shape to protrude outwardly so that the receiving surface can receive a laser beam coming from an oblique direction with respect to a direction where the lens is mounted on the lampbody, which passes through the flange-like shaped portion of the lens.

Figure 10:
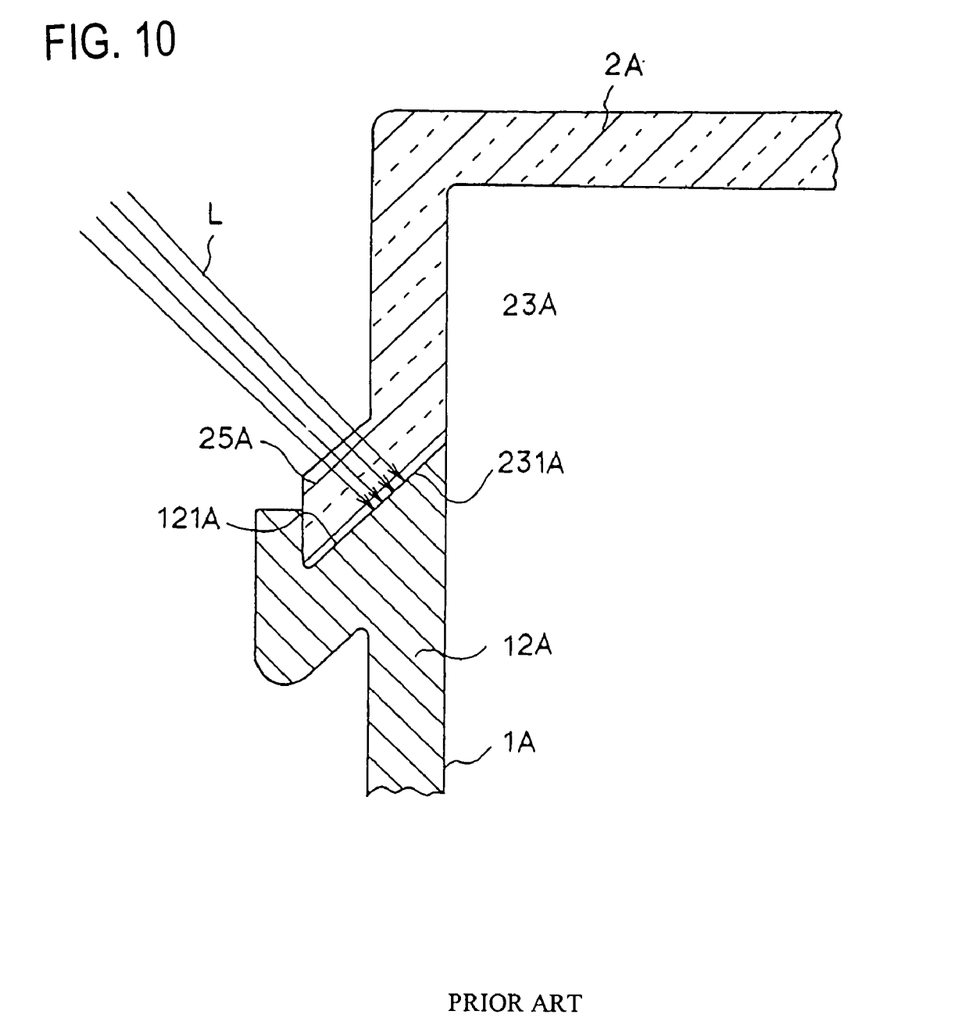
FIG. 10 is a sectional view showing a technology disclosed in Patent Document 1.

Specifically, as shown in FIG. 10, the laser welding is applied to the area where an abutment surface 231A at an end of a seal leg 23A of a lens 2 abuts on an abutment surface 121A of a peripheral wall 12A of a lamp body 1A. A laser beam receiving surface 25A that protrudes outward is formed on a top edge of the seal leg 23A to receive the laser beam L projected onto the laser beam receiving surface 25A from an outside of the lens 2A to the abutment surface 121A of the lamp body 1A such that the abutment surfaces 121A and 231A of the lens 2A and the lamp body 1A are laser welded. By way of this configuration, as described in Patent Document 1, compared with the conventional manner that the laser welding process is performed by projecting the laser beam onto the abutment surface while transmitting it through the seal leg along the abutment surface, the disclosed art allows an optical path length that the laser beam transmits through the lens to be shortened. Accordingly, it may be possible to preferably perform laser-welding and avoid loss of the laser beam energy on the abutment surfaces.

[Publication 1] JP-A-2001-243811

In Patent Document 1, the laser beam receiving surface is configured to protrude beyond the outer surface of the seal leg of the lens. When the lens is seen from the front, the laser beam receiving surface appears to protrude from the periphery of the lens. Accordingly, an outside dimension of the lens, i.e., the outside dimension of the lamp, becomes large. Further, when the welded surface between the lens and the lamp body is seen from the front through the lens, it appears dark. Because width dimensions of the laser welded surface (i.e., dimensions in a direction of the thickness of the seal leg) enlarges due to forming the laser beam receiving surface, the dark portion with larger width come out from the outer edge of the lens, and thereby the appearance of the lamp deteriorates. Further, a metal molding structure employed for forming the lens having the laser beam receiving surface configured to protrude beyond the outer surface of the seal leg may be complicated. Thus, this creates rising cost.

An object of the present invention is to provide a lamp with an improved appearance by reducing the dimensions of a laser-welded surface in a direction of its width and a method for manufacturing the lamp.

SUMMARY OF INVENTION

According to an embodiment of the present invention, in a vehicular lamp in which a lamp body and a lens are brought into abutment, and each abutment surface of the lamp body and the lens is laser welded, the abutment surface of the lens is structured so as not to protrude outward at least from an outer surface of the lens, and to inclines with respect to a direction where the lamp body and the lens are brought into abutment.

According to an embodiment of the present invention, a method of manufacturing a vehicular lamp includes the steps of forming an inclined abutment surface that does not protrude beyond an outer surface of a lens along its peripheral portion, forming an inclined abutment surface along a peripheral portion of a front opening of a lamp body, and projecting a laser beam from an outside of the outer surface of the lens while holding the abutment surfaces of the lens and the lamp body in an abutment state such that the abutment surfaces are welded. In the method, the laser beam is projected at a predetermined angle in consideration with a refractive index of the laser beam on the outer surface of the lens such that the laser beam is projected in a direction perpendicular to the abutment surfaces.

According to an embodiment of the present invention, the laser welded surface is formed so as not to protrude beyond the outer surface of the lens. This may reduce the dimensions of the dark portion around the periphery of the lens when seen from the front. Thus the outer appearance of the lamp may be improved. Further, as the laser welded surface is inclined with respect to the direction where the lens is mounted on the lamp body, the laser-welded area may be expanded. Accordingly, welding performance may be enhanced.

According to an embodiment of the present invention, the angle of the projected laser beam with respect to the outer surface of the lens is adjusted such that the laser beam is projected in the direction perpendicular to the inclined abutment surface. Thus, the laser beam can be efficiently projected to the abutment surface without the laser beam receiving surface protruded outward. Accordingly, this makes it possible to make desirable laser welding.

Other aspects and advantages of the invention will be apparent from the following description and the appended claims.

BRIEF DESCRIPTION OF DRAWINGS

FIGS. 4(*a*) through 4(*c*) are a view showing a welding process applied to the lamp according to an embodiment of the present invention.

FIGS. 6(*a*) and 6(*b*) is a sectional view of an essential portion of a modified example of an embodiment of the present invention.

FIGS. 9(*a*) and 9(*b*) are a view showing a function of a flange portion in an embodiment of the present invention.

DETAILED DESCRIPTION

In the preferred embodiment of the present invention, the lens includes a seal leg portion with a substantially uniform thickness which extends in a direction where the lamp body and the lens are brought into abutment along an edge portion of the lens, and an end surface of the seal leg portion serves as the abutment surface. The abutment surface may be formed within a range of the thickness of the seal leg portion. Thus, the aesthetic appearance of the lamp improves. Further, the lamp body includes a tapered flange portion, which protrudes outward along the outer surface thereof, configured to gradually reduce its thickness as it goes outward, and a top surface of the flange portion serves as the abutment surface. Advantageously, the flange portion allows abutting performance between both to be enhanced upon deformation of the flange portion causing by abutment of the lens on the lamp body, and accordingly, the welding performance improves.

Figure 1:
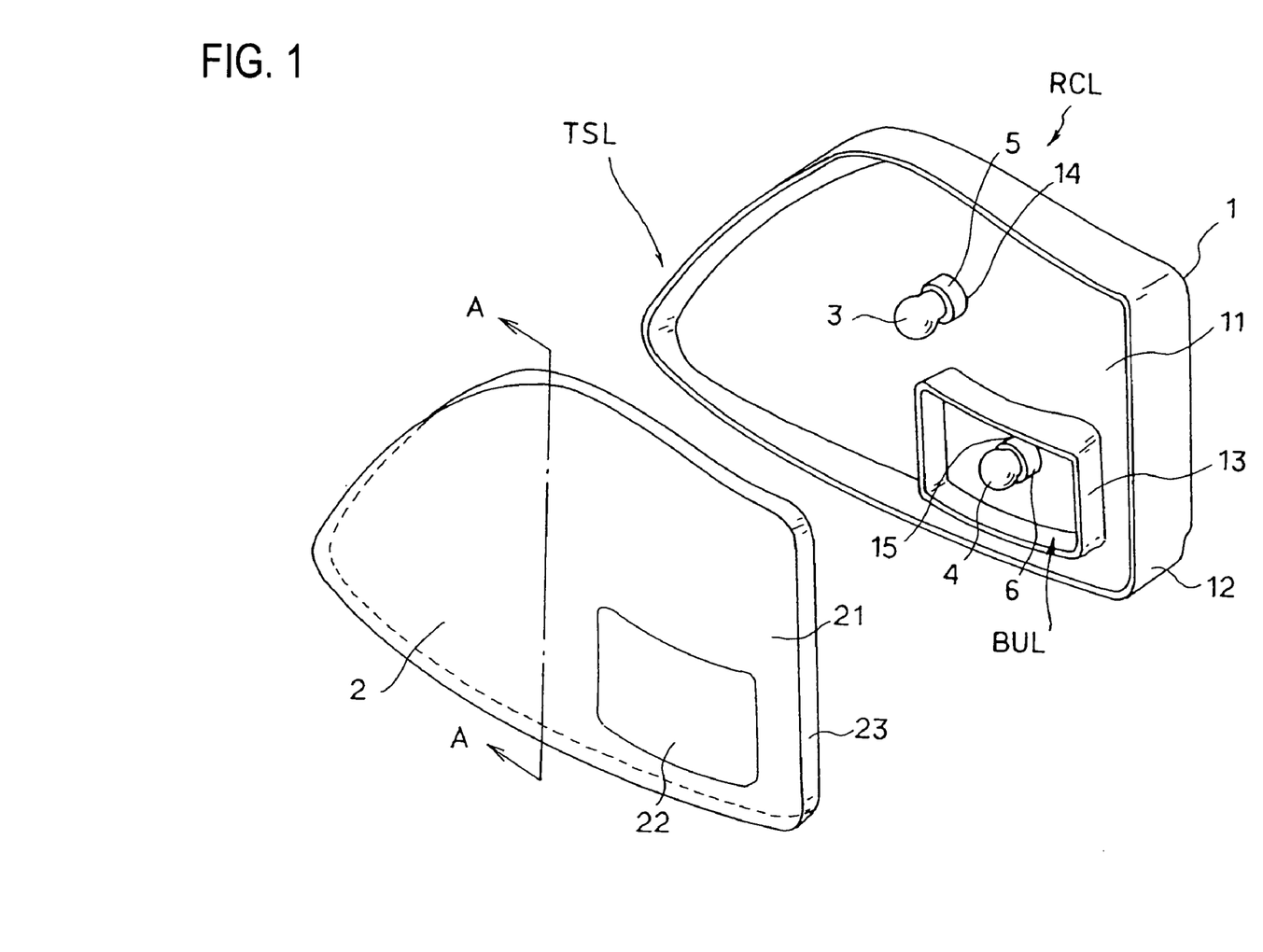
FIG. 1 is a partially exploded schematic view of a lamp according to an embodiment of the present invention.
Figure 2:
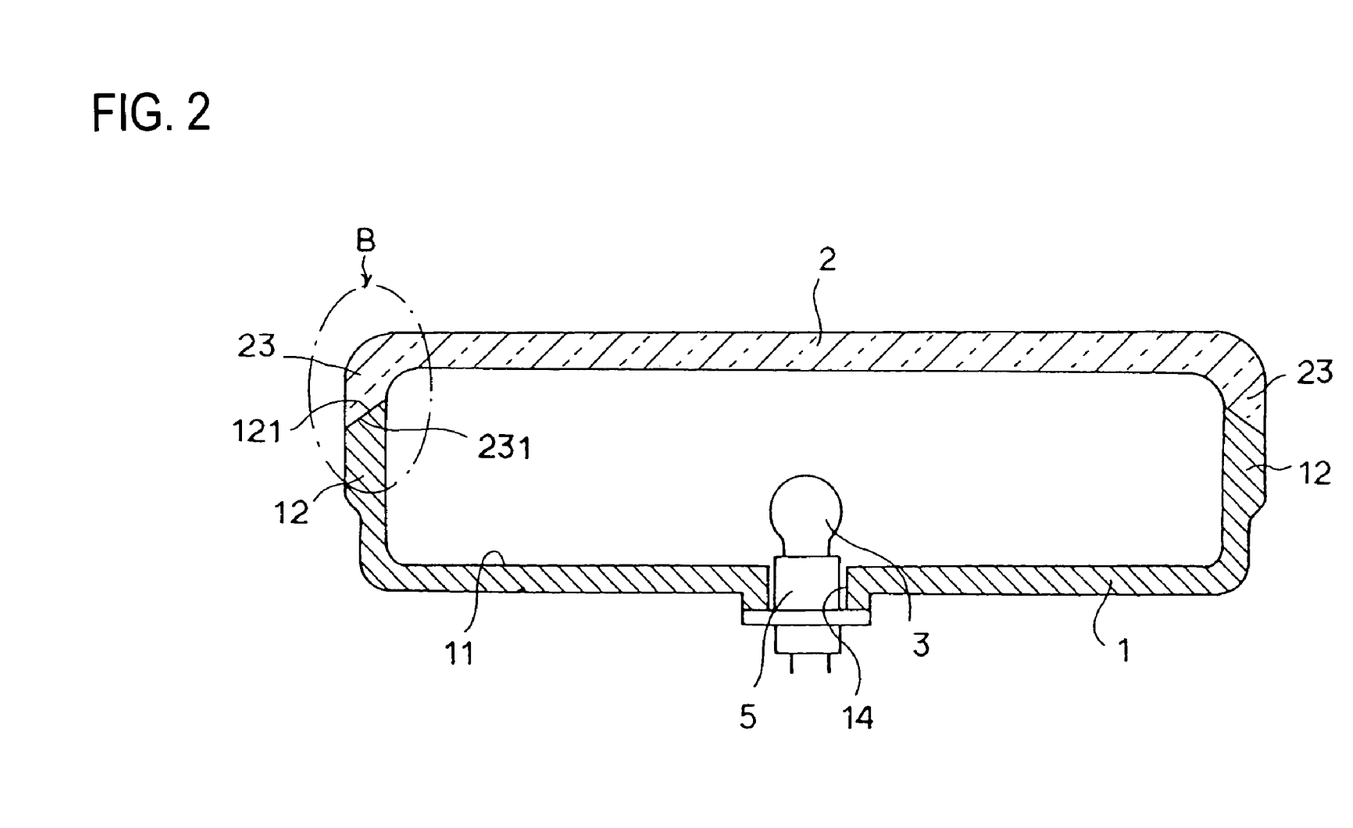
FIG. 2 is a sectional view taken along line A—A of FIG. 1.

An embodiment of the present invention will be described with reference to the drawings. FIG. 1 is a partially exploded schematic view of this embodiment applied the present invention to a tail lamp for a vehicle, in particular, a rear combination lamp RCL, which is integrated with a tail/stop lamp TSL and a back-up lamp. FIG. 2 is a sectional view along A—A line of the rear combination lamp RCL in assembling. A lamp body 1 is formed in a housing-like shape with a back surface 11 and a peripheral wall portion 12 that extends along the peripheral edge thereof, and made from ASA (acrylonitrile styrene acrylic rubber) containing a laser beam absorbing material such as a carbon black by a resin molding. A wall-like shade 13 is formed on an inner surface of the back surface 11 of the lamp body 1, by which the tail/stop lamp TSL and the back-up lamp BUL are partitioned. Each of the inner surfaces of the back surface 11 and the peripheral wall portion 12 is treated with an aluminum evaporation. A predetermined portion of the peripheral wall portion 12, i.e., the portion where the lens is welded is not treated with the aluminum evaporation. The back surface 11 of the lamp body 1 has holes 14 and 15 corresponding to the lamps TSL and BUL, respectively. A tail/stop bulb 3 and a back-up bulb 4 are attached each other with bulb sockets 5 and 6.

A lens 2 is integrally attached to the lamp body 1 so as to cover a front opening of the lamp body by welding. The lens 2 is composed of a red-colored tail/stop lens 21 and a white-colored back-up lens 22 formed on a predetermined area of the tail/stop lens 21, which are integrally molded by a co-injection molding method upon resin material such as PC. The lens 2 has a wall-like seal leg 23 that extends along its peripheral edge. An end portion of the seal leg 23 is laser welded to an end portion of the peripheral wall portion 12 of the lamp body 1 such that the lens 2 is integrated with the lamp body 1, configured to hermetically seal the gap therebetween.

Figure 3:
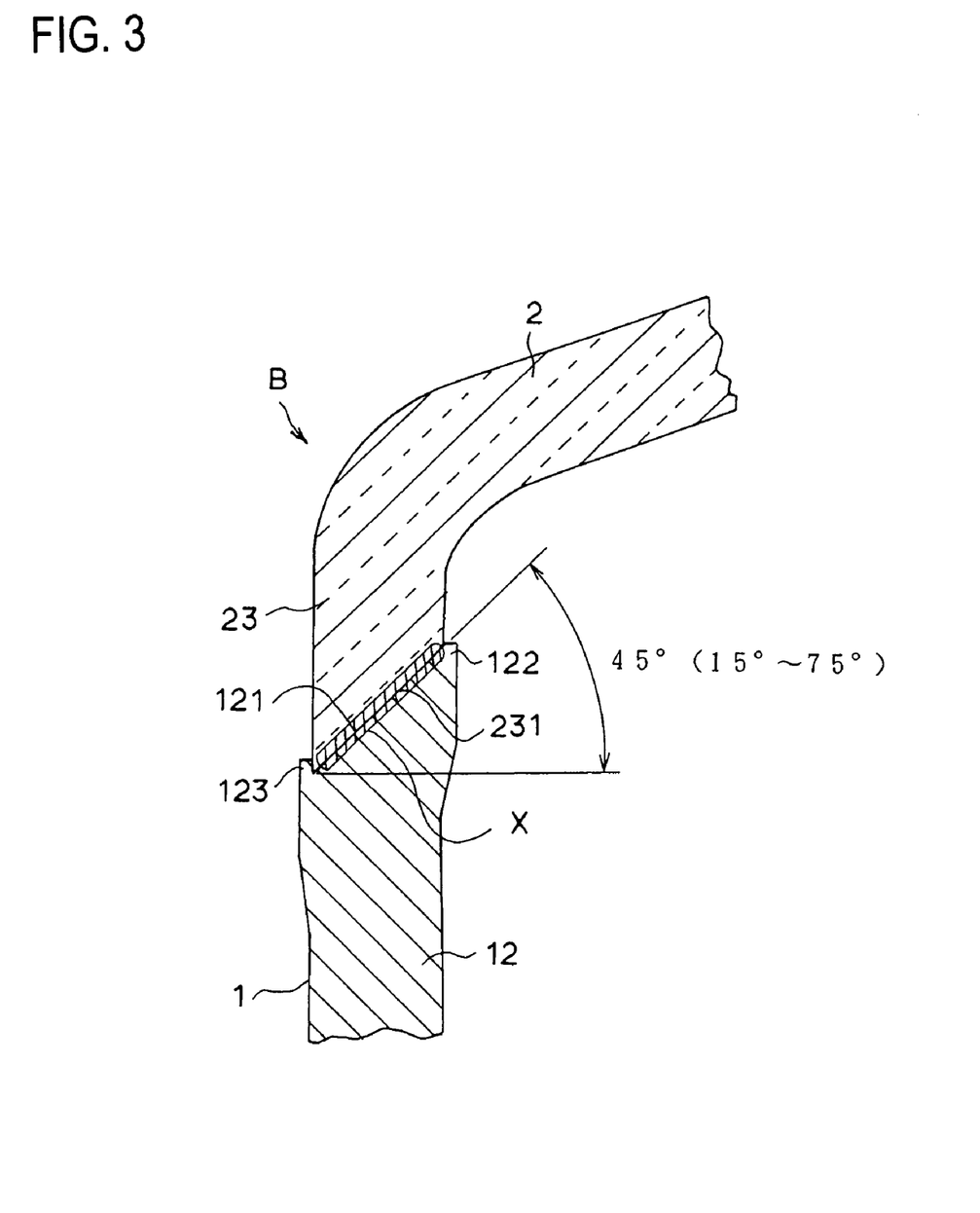
FIG. 3 is an enlarged sectional view of a portion B shown in FIG. 2.

FIG. 3 is an enlarged sectional view representing a portion B at which the lens 2 is welded to the lamp body 1 in FIG. 2. The peripheral wall portion 12 of the lamp body 1 extends in parallel with an optical axis with a uniform thickness. A top surface of the peripheral wall portion 12 serves as an abutment surface 121 inclined outward at about 45° with respect to the optical axis. Similarly, the seal leg 23 of the lens 2 extends in parallel with the optical axis with a uniform thickness, and a top surface of the seal leg 23 serves as an abutment surface 231 inclined inward at about 45° with respect to the optical axis. The lens 2 is brought into abutment on the lamp body 1 in a direction of the optical axis such that the abutment surface 121 of the peripheral wall portion 12 abuts on the abutment surface 231 of the seal leg 23. Then, they are contacted tightly with each other. A laser beam in a condensed state is projected to the tightly contacted abutment surfaces from an outer surface of the lens 2. The abutment surfaces 121 and 231 of the lamp body 1 and the lens 2 are brought into molten states, and accordingly welded (the welded surface is shown by a reference code X). The lens 2 is, thus, integrated with the lamp body 1. In this embodiment, the thickness of the top end of the peripheral wall portion 12 is slightly larger than that of the seal portion 23 for the purpose of positioning the seal leg 23. Protrusions 122 and 123 are formed on the inner surface and the outer surface of the seal leg 23, respectively, if so desired.

Figure 4A:
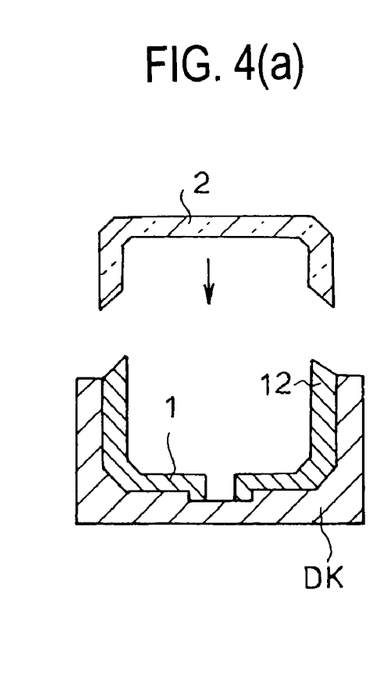
Figure 4B:
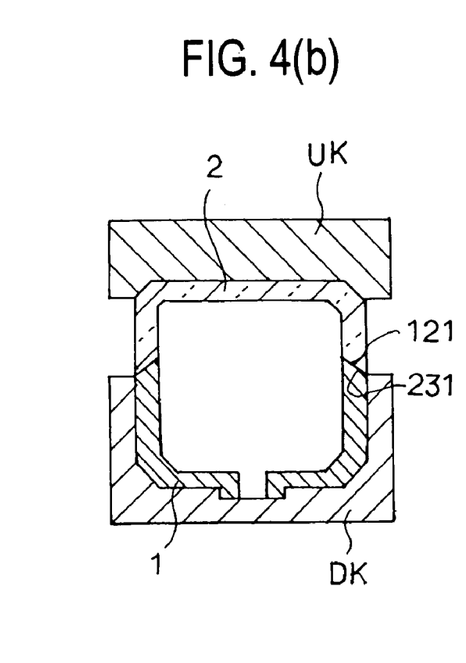
Figure 4C:
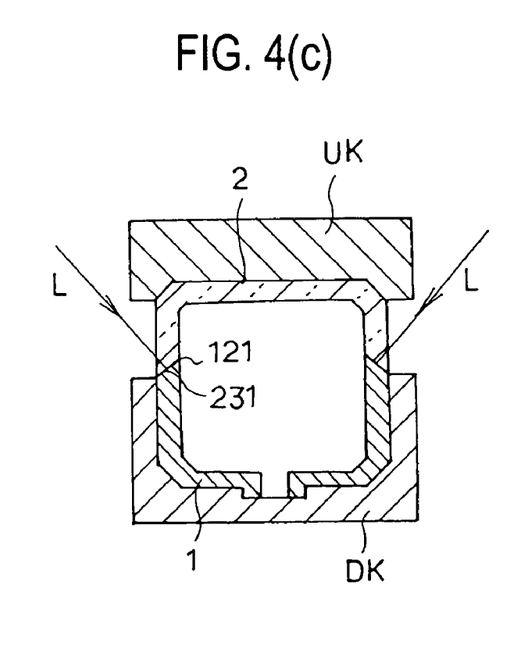

Referring to FIG. 4(*a*), in welding the lamp body 1 and the lens 2 together at the abutment surfaces 121 and 231, the lamp body 1, which has been resin molded and aluminum evaporated on its predetermined surface, is seated on a lower mold DK such that the abutment surface 121 of the peripheral wall portion 12 faces upward. Meanwhile, the lens 2 is placed above the lamp body 1 with a positioning jig (not shown) such that the abutment surface 231 of the seal leg 23 abuts on the abutment surface 121 of the peripheral wall portion 12. Referring to FIG. 4(*b*), the upper mold UK is moved down to apply a downward pressure force to the lens 2 so that the lens 2 is pressed at a predetermined pressure against the lamp body 1. In this state, as shown in FIG. 4(*c*), the laser beam L is projected from the outer surface of the lens 2, more specifically, from the outer surface of the seal leg 23 toward the abutment surfaces 121 and 231, which are in tight contact with each other, in a direction perpendicular thereto. Energy of the projected laser beam L is absorbed by the laser absorbing material contained in the lamp body 1 to cause the abutment surface 121 to be heated and brought into a molten state. Such heat is transferred to the abutment surface 231 of the lens 2 in tight contact with the abutment surface 121, and then the abutment surface 231 of the lens 2 is brought into the molten state. By doing so, both the abutment surfaces 121 and 231 of the lamp body 1 and the lens 2 are melted and, accordingly, they will be bonded together after being cooled and solidified.

Figure 5:
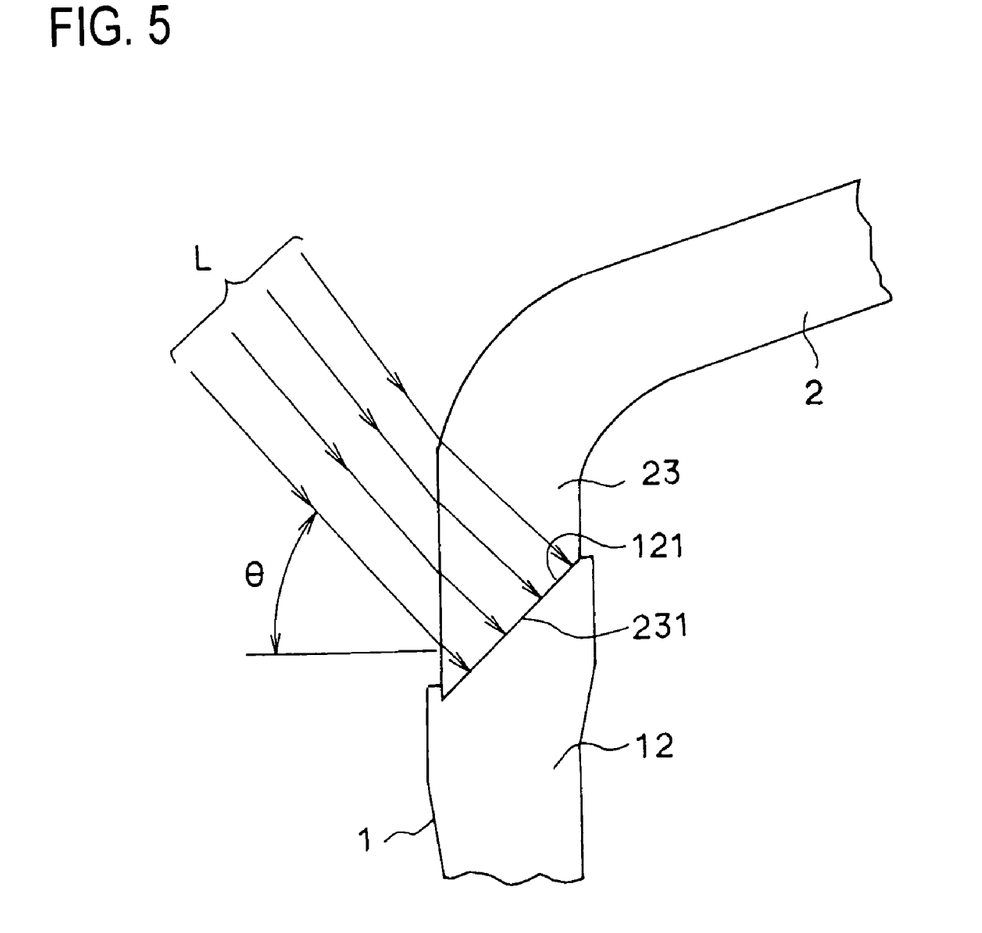
FIG. 5 is a view showing a laser welding performed in an embodiment of the present invention.

As shown in FIG. 5, the laser beam L projected to the lens 2 is refracted upon incedence into the lens 2 from the outer side surface of the seal leg 23, and it is further projected to the abutment surfaces 121 and 231. Accordingly, the laser beam L is projected so as to reach the lens 2 at an angle θ that is slightly larger than 45° with respect to the plane perpendicular to the outer surface of the seal leg 23 in consideration of the refractive index of light rays on the lens 2. The laser beam L that reaches the lens 2 is refracted and further projected in a direction perpendicular to the abutment surfaces 121 and 231. This may allow the laser beam energy to be more efficiently used for the welding compared with the case that the laser beam is projected in the oblique direction with respect to the abutment surfaces 121 and 231. Accordingly, the welding performance can be enhanced.

When the above-structured lamp RCL is seen from the front, the abutment surface 231 of the seal leg 23 of the lens 2 may appear to be dark through the lens 2 around its periphery due to the welding of the lens 2 to the lamp body 1. However, in the seal leg 23 of the lens 2, there is no protrusion that protrudes outward from the outer surface of the lens, which forms an outside dimension of the lens 2, as shown in Patent Document 1. Thus, the abutment surface 231 of the lens 2, i.e., the welded surface X, is formed so as not to exceed over the thickness of the seal leg 23. The width of the dark portion is less than, or comparable to, the thickness of the seal leg 23. Thus, the aesthetic appearance of the lamp improves. Further, as each of the abutment surfaces 121 and 231 inclines with respect to the optical axis of the lamp body 1 and the lens 2, i.e., the direction where the peripheral wall portion 12 and the seal leg 23 extend, the area of the welded surface X may be expanded compared with each thickness of those portions. Accordingly, this allows the welding performance to be enhanced.

Preferably, the inclined angle at the abutment surfaces 121 and 231 of the lamp body 1 and the lens 2 is between 15° and 75°. If the inclined angle is smaller than 15°, it is difficult to project the laser beam in the direction perpendicular to the abutment surfaces. Thus, more laser energy is reflected on the incident surface of the lens, and a certain amount of energy cannot be absorbed. As a result, this may bring about insufficient welding. On the other hand, if the inclined angle is larger than 75°, the inclined angle at the abutment surface becomes so sharp that it is difficult to be resin molded. In this case, when the aforementioned abutment surfaces are pressed in the abutment state, the resultant force to displace each position of the lens and the lamp body further increases based on wedge effect. It may be difficult to weld while accurately positioning the lens and the lamp body.

Figure 6A:
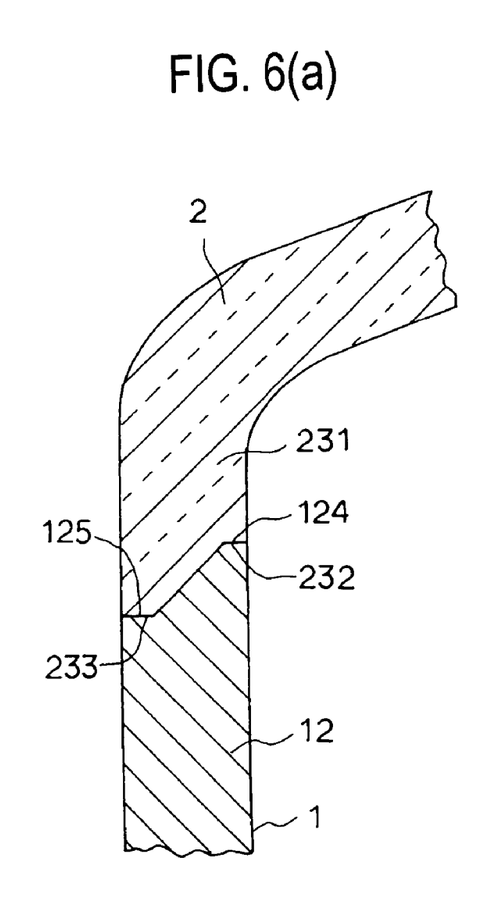
Figure 6B:
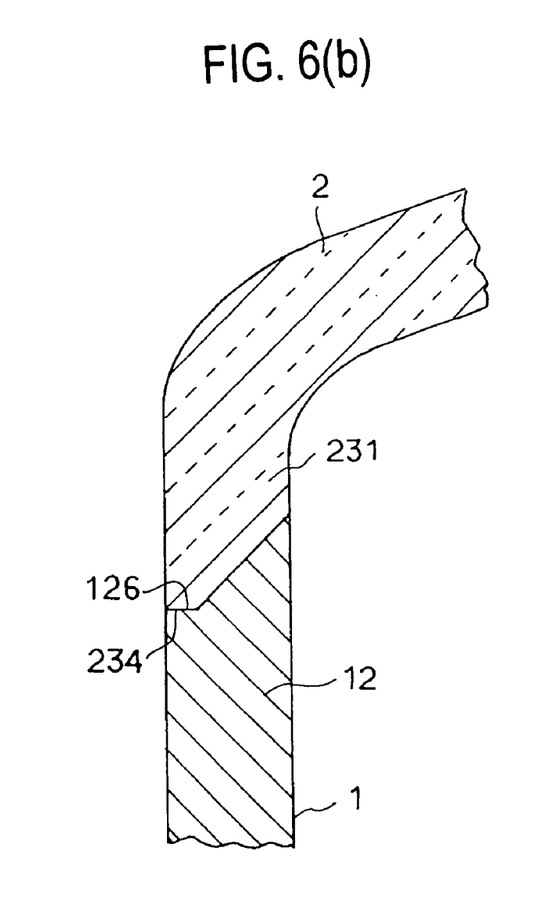

In this embodiment, the abutment surfaces are completely inclined. Meanwhile, the lamp body and the lens may have portions 124 and 125, and 232 and 233, respectively, which are configured to be perpendicular to the direction where the lens mounts on the lamp body, in the area at the inner and outer sides of the abutment surfaces as shown in FIG. 6(*a*). Alternatively, the lamp body and the lens may have portions 126 and 234 respectively, which are configured to be perpendicular to the direction where the lens mounts on the lamp body, in the outer side of the abutment surfaces as shown in FIG. 6(*b*). These portions can effectively prevent a displacement between the lamp body 1 and the lens 2 causing by slipping upon the abutment surfaces.

Figure 7:
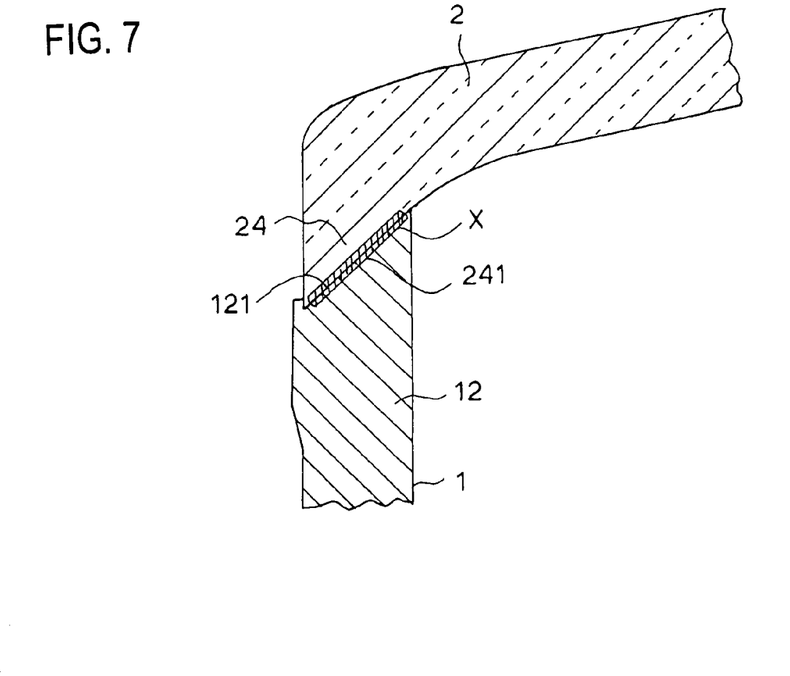
FIG. 7 is a sectional view showing an essential portion of an embodiment of the present invention.

FIG. 7 is an enlarged sectional view representing another embodiment, which corresponds to FIG. 3 of the aforementioned embodiment. In this embodiment, the seal leg is not formed on a part of the lens 2 in the peripheral direction but a protrusion 24 having a triangular shape in cross section is formed at the inner side of the lens 2. A tapered surface 241 of the protrusion 24 serves as the abutment surface. The abutment surface 121 of the lamp body 1 is inclined outward at about 45° with respect to the optical axis as with the aforementioned embodiment. The abutment surface 241 of the protrusion 24 of the lens 2 is inclined inward at about 45° with respect to the optical axis so as to correspond to the abutment surface 121. The lamp body 1 and the lens 2 are contacted in the direction of the optical axis such that the abutment surface 121 of the peripheral wall portion 12 and the abutment surface 241 of the protrusion 24 are brought into abutment in the direction of the optical axis and tightly contacted with each other. The condensing laser beam is projected from the outside of the outer surface of the lens toward the abutment surfaces 121 and 241. By doing so, those abutment surfaces 121 and 241 are brought into molten states and are welded. Accordingly, the lens 2 is integrated with the lamp body 1.

In this embodiment, the thickness of the lens 2 can be reduced at the portion of the protrusion 24. This allows the laser beam to be projected from the front side of the lens 2. In this case, however, the laser beam can be projected from the outer surface of the protrusion 24 toward the abutment surfaces 121 and 241 in the perpendicular direction by using the refraction of the laser beam by the outer surface. The energy efficiency of the laser beam can be improved, resulting in quality welding performance. Also, this embodiment allows the lens without the seal leg to be appropriately welded to the lamp body. Accordingly, the design freedom of the lens may be increased, improving design itself.

Further, in this embodiment, the abutment surface 241 of the protrusion 24 formed on the peripheral edge of the lens 2 and welded to the lamp body 1 appears to be dark through the lens 2 when the lamp is seen from the front as with in the aforementioned embodiment. However, as the lens 2 has no protrusion that protrudes outward, the width of the dark portion may be reduced to the dimension as small as possible. Thus, the aesthetic appearance of the lamp improves.

Figure 8:
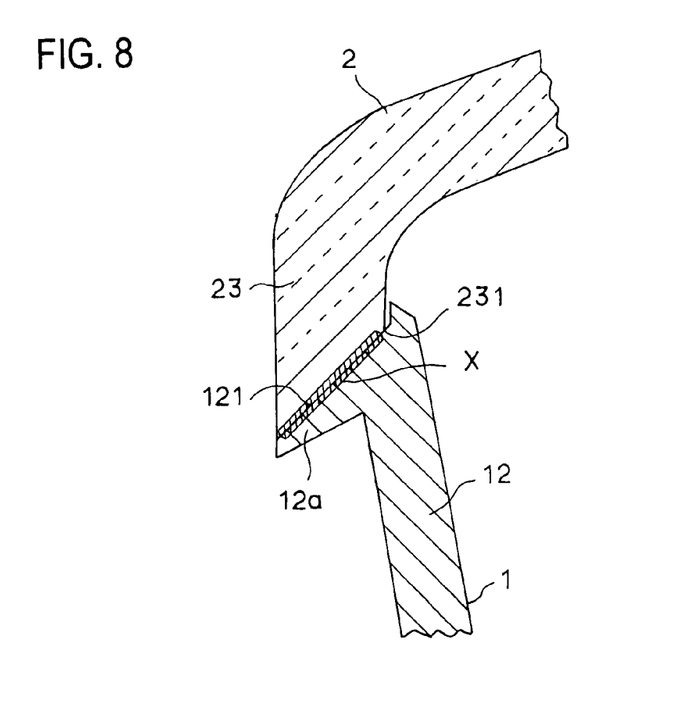
FIG. 8 is a sectional view showing an essential portion of an embodiment of the present invention.

FIG. 8 is an enlarged sectional view representing another embodiment, which corresponds to FIG. 3 representing the aforementioned embodiment. In this embodiment, the lens 2 has a seal leg 23 as with the aforementioned embodiment. The seal leg 23 has an abutment surface 231 with an inclined end surface. Meanwhile, the lamp body 1 includes a tapered flange 12*a*, which protrudes outward along an end of the peripheral wall portion 12, configured to gradually reduce its thickness as it goes outward. The surface of the flange 12*a* serves as an abutment surface 121. The abutment surface 121 of the flange 12*a* is brought into abutment on the abutment surface 231 of the lens 2, where laser welding process is performed.

In this embodiment, the laser beam is projected from the outside of the seal leg 23 of the lens 2 at a predetermined angle in the same manner as the aforementioned embodiments. Thus, the laser beam is projected to the abutment surfaces 121 and 231 in the direction perpendicular thereto based on the refraction by the outer surface of the lens 2. Accordingly, the abutment surfaces 121 and 231 can be appropriately welded. Further, the seal leg 23 of the lens 2 has no protrusion that protrudes outward from the outer surface of the lens 2. That is, the abutment surface 231 of the lens 2 is formed so as not to protrude over the width of the seal leg 23. The width of the dark portion is less than or comparable to the thickness of the seal leg 23. Accordingly, the aesthetic appearance of the lamp body is improved.

Figure 9A:
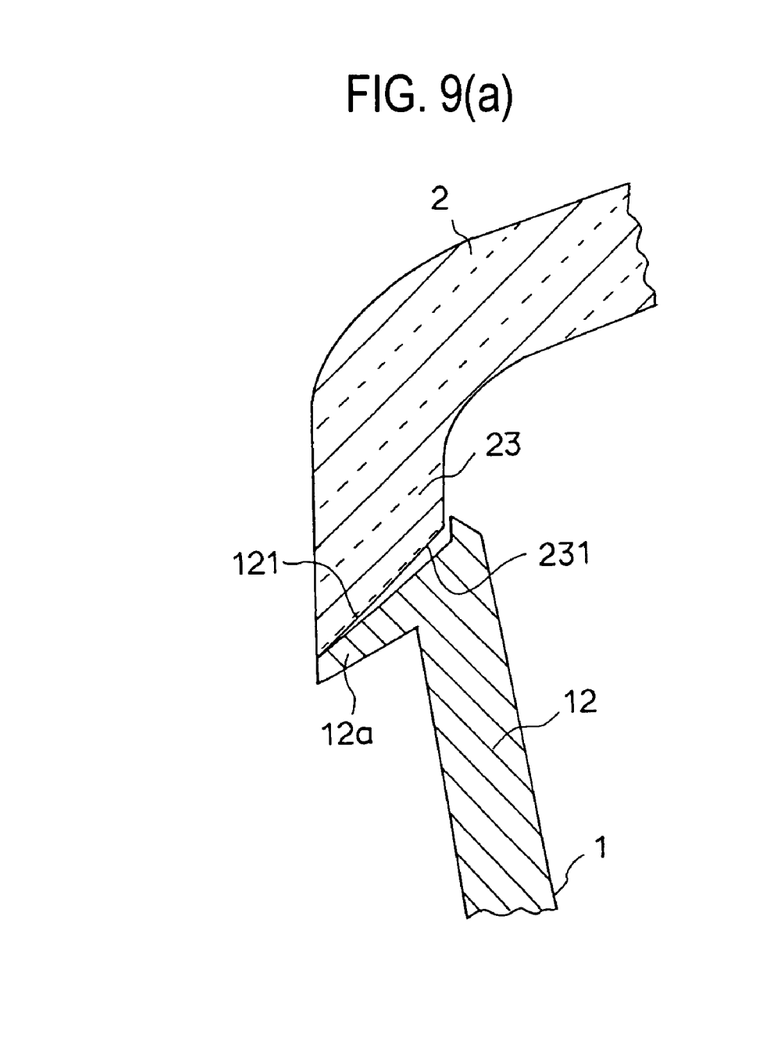
Figure 9B:
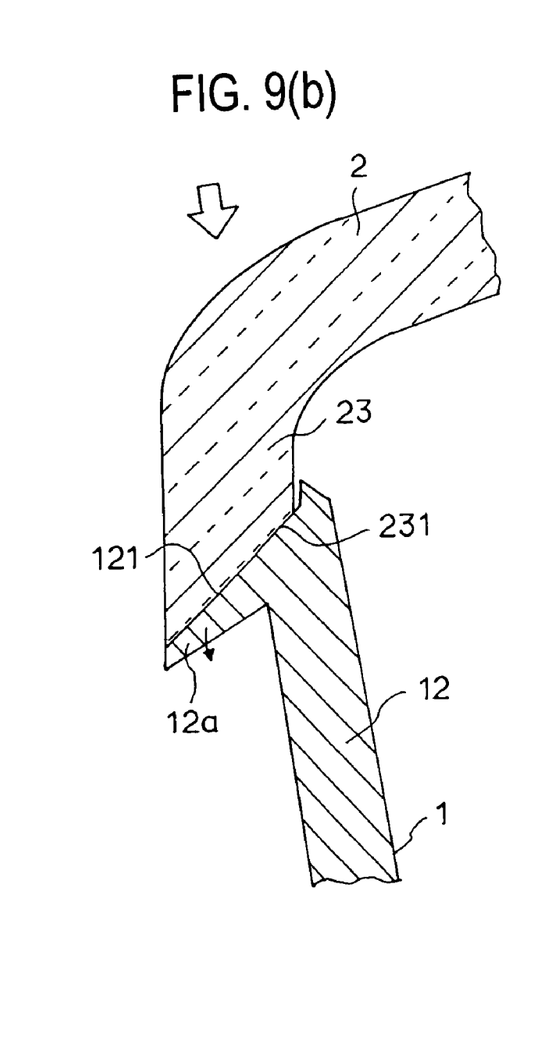

Furthermore, it is assumed that, as shown in FIG. 9(*a*), each angle of the abutment surface 231 of the lens 2 and the abutment surface 121 of the flange 12*a* upon abutment is not equal due to an error in the process of molding the lamp body 1 and the lens 2, and that a gap is formed between the abutment surfaces 121 and 231 in the abutment state. In this case, when the lens 2 abuts on the lamp body 1 under pressure for performing the welding, the tapered flange 12*a* is deformed by the force caused by the pressure applied to the lens 2 as shown by arrow in FIG. 9(*b*). This may enhance the contact between the abutment surfaces 121 and 231, and accordingly improve the laser welding quality.

The present invention is not limited to the rear combination lamp in the respective embodiments as described above. It is understood that the present invention may be applied to various forms of the lamp so long as it is formed by integrally welding the lens to the lamp body.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicular lamp comprising:
a lamp body, capable of housing a lamp source, having an abutment surface configured to incline to an optical axis of the lamp source at a peripheral portion thereof; and
a lens having an abutment surface configured within an outside dimension of an outer surface of the lens and at an peripheral portion of the lens so as to correspond to the abutment surface of the lamp body,
wherein the abutment surface of the lens is integrally attached to the abutment surface of the lamp body by laser welding,
wherein the lens comprises a leg portion configured to rise in a first direction along the optical axis at the peripheral portion and a tip of the leg portion serves as the abutment surface of the lens,
wherein the leg portion is configured in a substantially uniform thickness, and
wherein inclined abutment surface of the lamp body and the abutment surface of the lens are adapted to receive laser projected from a direction substantially perpendicular to the inclined abutment surfaces.

2. The vehicular lamp according to claim 1, wherein the lamp body comprises a peripheral wall configured to rise in a second direction along the optical axis at the peripheral portion of the lamp body and a top portion of the peripheral wall serves as the abutment surface of the lamp body.

3. The vehicular lamp according to claim 2, wherein the peripheral wall has a flange portion configured to extend outwardly along an outer surface of the peripheral wall, and wherein a surface of the flange portion serves as the abutment surface of the lamp body.

4. The vehicular lamp according to claim 3, wherein the flange portion is configured in a tapered shape to gradually reduce a thickness thereof.

5. The vehicular lamp according to claim 2, wherein a thickness of the top portion of the peripheral wall gradually reduces toward a tip of the peripheral wall, configured to serve as the abutment surface of the lamp body.

6. The vehicular lamp according to claim 1, wherein the abutment surface of the lamp body is chamfered at an angle between 15 and 75 degrees.

7. A vehicular lamp comprising:
a lamp body, capable of housing a lamp source, having an abutment surface configured to incline to an optical axis of the lamp source at a peripheral portion thereof; and
a lens having an abutment surface configured within an outside dimension of an outer surface of the lens and at an peripheral portion of the lens so as to correspond to the abutment surface of the lamp body, wherein
the abutment surface of the lens is integrally attached to the abutment surface of the lamp body by laser welding,
the lamp body comprises a peripheral wall configured to rise in a direction along the optical axis at the peripheral portion and a top portion of the peripheral wall serves as the abutment surface of the lamp body,
a thickness of the top portion of the peripheral wall gradually reduces toward a tip of the peripheral wall, configured to serve as the abutment surface of the lamp body, and
the abutment surface of the peripheral wall has at least one surface configured in a direction substantially perpendicular to the optical axis.

8. A method of manufacturing a vehicular lamp, comprising:
forming an inclined abutment surface of a lens along a peripheral portion of the lens so as not to protrude over an outer surface of the lens;
forming an inclined abutment surface of a lamp body along a front opening of the lamp body, corresponding to the inclined abutment surface of the lens; and
projecting a laser beam from an outside of the lens to laser weld,
wherein the laser beam is projected at a predetermined incident angle based on a refraction index by the outer surface of the lens such that an incident angle of the laser beam projected on the abutment surfaces is in a direction substantially perpendicular to the inclined abutment surfaces.

9. The method according to claim 8, further comprising:
seating the lamp body on a lower mold such that the inclined abutment surface of the lamp body faces upward; and
mounting the lens on the lamp body such that the inclined abutment surface of the lens brings into contact with the inclined abutment surface of the lamp body.

* * * * *